United States Patent
Hwang et al.

(10) Patent No.: US 8,545,013 B2
(45) Date of Patent: Oct. 1, 2013

(54) WEARABLE ELECTRONIC DISPLAY

(75) Inventors: Hoosung Hwang, Kyeonggi-do (KR); Jhang Woo Lee, Seoul (KR)

(73) Assignee: Kopin Corporation, Westborough, MA (US)

( * ) Notice: Subject to any disclaimer, the term of this patent is extended or adjusted under 35 U.S.C. 154(b) by 208 days.

(21) Appl. No.: 13/093,378

(22) Filed: Apr. 25, 2011

(65) Prior Publication Data
US 2011/0273662 A1 Nov. 10, 2011

Related U.S. Application Data

(60) Provisional application No. 61/328,599, filed on Apr. 27, 2010.

(51) Int. Cl.
  G02C 1/00 (2006.01)
  G02C 11/00 (2006.01)
  H04R 1/10 (2006.01)
(52) U.S. Cl.
  CPC .............. *G02C 11/10* (2013.01); *H04R 1/1066* (2013.01)
  USPC .......................................... 351/158; 381/381
(58) Field of Classification Search
  CPC ............................. G02C 11/10; H04R 1/1066
  USPC .. 351/41, 111, 140, 158; 2/452; 349/13–15; 381/374, 376, 381
  See application file for complete search history.

(56) References Cited

U.S. PATENT DOCUMENTS

| | | | |
|---|---|---|---|
| 4,538,034 A * | 8/1985 | French | 381/383 |
| 4,986,649 A | 1/1991 | Smith | |
| 5,162,828 A | 11/1992 | Furness et al. | |
| 5,335,285 A * | 8/1994 | Gluz | 381/381 |
| D351,622 S | 10/1994 | Holmes | |
| D370,909 S | 6/1996 | Oikawa et al. | |
| D375,495 S | 11/1996 | MacIness et al. | |
| 5,606,743 A | 2/1997 | Vogt et al. | |
| D383,455 S | 9/1997 | MacInnes et al. | |
| 5,703,670 A | 12/1997 | Callard | |
| D389,826 S | 1/1998 | Cousins | |
| 5,774,096 A | 6/1998 | Usuki et al. | |
| D397,334 S | 8/1998 | Larian | |
| 5,812,224 A | 9/1998 | Maeda et al. | |
| 5,880,773 A * | 3/1999 | Suzuki | 348/115 |
| 5,892,564 A | 4/1999 | Rahn | |
| 5,903,395 A | 5/1999 | Rallison et al. | |
| 5,991,085 A | 11/1999 | Rallison et al. | |
| D417,447 S | 12/1999 | Hirose et al. | |
| D424,553 S | 5/2000 | Larian | |
| D427,982 S | 7/2000 | Ishii | |
| 6,124,837 A | 9/2000 | Usuki et al. | |
| D432,508 S | 10/2000 | Park et al. | |
| 6,157,291 A | 12/2000 | Kuenster et al. | |
| D444,155 S | 6/2001 | Morooka et al. | |
| 6,301,050 B1 | 10/2001 | DeLeon | |
| 6,388,640 B1 | 5/2002 | Chigira et al. | |

(Continued)

*Primary Examiner* — Huy K Mai
(74) *Attorney, Agent, or Firm* — Hamilton, Brook, Smith & Reynolds, P.C.

(57) ABSTRACT

A wearable electronic display includes an eyewear display and a flexible band attached to the eyewear display for securing the eyewear display to the user's head. At least one speaker is slidably attached below the flexible band by a slidable mount. The slidable mount is capable of sliding forwardly and rearwardly on the flexible band for adjusting the at least one speaker to the user's ears.

19 Claims, 9 Drawing Sheets

(56) References Cited

U.S. PATENT DOCUMENTS

| | | |
|---|---|---|
| 6,449,309 B1 | 9/2002 | Tabata |
| 6,452,572 B1 | 9/2002 | Fan et al. |
| 6,480,174 B1 | 11/2002 | Kaufmann et al. |
| 6,496,161 B1 | 12/2002 | Tanaka |
| 6,677,919 B2 | 1/2004 | Saito |
| 6,914,583 B1 | 7/2005 | Chigira |
| 6,978,478 B2 | 12/2005 | Urakawa et al. |
| D521,493 S | 5/2006 | Wai |
| 7,147,324 B2 | 12/2006 | Jannard et al. |
| 7,161,560 B2 | 1/2007 | Patterson |
| 7,213,917 B2 | 5/2007 | Jannard et al. |
| 7,216,973 B2 | 5/2007 | Jannard et al. |
| D545,344 S | 6/2007 | Yang |
| D546,866 S | 7/2007 | Yang |
| 7,264,350 B2 | 9/2007 | Jannard et al. |
| RE40,438 E | 7/2008 | Urakawa et al. |
| 7,461,936 B2 | 12/2008 | Jannard |
| 7,576,919 B2 * | 8/2009 | Durner et al. .................. 359/630 |
| 7,682,018 B2 | 3/2010 | Jannard |
| 7,740,353 B2 | 6/2010 | Jannard |
| 7,786,424 B2 | 8/2010 | Durner et al. |
| D628,616 S | 12/2010 | Yuan |
| 2006/0197907 A1 | 9/2006 | Jannard et al. |
| 2009/0156128 A1 | 6/2009 | Franson et al. |
| 2010/0177504 A1 * | 7/2010 | Lau ............................... 362/105 |
| 2010/0238396 A1 | 9/2010 | Jannard |
| 2010/0253904 A1 | 10/2010 | Jannard |

* cited by examiner

WEARABLE ELECTRONIC DISPLAY

RELATED APPLICATION

This application claims the benefit of U.S. Provisional Application No. 61/328,599, filed on Apr. 27, 2010. The entire teachings of the above application are incorporated herein by reference.

BACKGROUND

Wearable electronic displays can have an electronic eyewear display for providing viewable images, as well as speakers for providing sound. Since each user can have a different head size, the viewing and sound provided by the wearable electronic display can be unsatisfactory for some users, unless size adjustments can be made.

SUMMARY

The present invention provides a wearable electronic display that can adjustably secure an electronic eyewear display to a user's head, and provide adjustable speaker positions in a simple light weight manner. The wearable electronic display can include an eyewear display. A flexible band can be attached to the eyewear display for securing the eyewear display to a user's head. At least one speaker can be slidably attached below the flexible band by a slidable mount. The slidable mount is capable of sliding forwardly and rearwardly on the flexible band for adjusting the at least one speaker to the user's ears.

In particular embodiments, two speakers can be slidably attached below the flexible band on opposite sides of the eyewear display by two respective slidable mounts which slide on the flexible band. Each slidable mount can have a sliding mount length $L_m$ and a lateral mount thickness $T_m$, and each speaker can have a speaker length $L_s$ and a lateral speaker thickness $T_s$. The sliding mount length $L_m$ and the lateral mount thickness $T_m$ can be less than the respective speaker length $L_s$ and the lateral speaker thickness $T_s$, thereby limiting the amount of the flexible band that is constrained by the slidable mount and size of the slidable mount pressed by the flexible band against a user's head. The speakers can be mounted to the slidable mounts by respective stems which are angled rearwardly. The speakers can be positioned on an upper side of a portion of the stems. The flexible band can be made of a fabric strap. Each slidable mount can include a narrow flattened post having a slot through which the flexible band extends. A resilient forehead support can extend from the eyewear display rearwardly for providing support against the user's forehead. The forehead support can include a rubber member having elongate lateral slots for providing flexibility to the forehead support to adjust to different head sizes.

The present invention can also provide a wearable electronic display including an eyewear display. A flexible band can be attached to the eyewear display for securing the eyewear display to a user's head. Two speakers can be slidably attached below the flexible band on opposite sides of the eyewear display by two respective slidable mounts. The slidable mounts are capable of sliding forwardly and rearwardly on the flexible band for adjusting the speakers to the user's ears. Each slidable mount can include a narrow flattened post having a slot through which the flexible band extends, and a slidable mount length $L_m$ and a lateral mount thickness $T_m$. Each speaker can have a speaker length $L_s$ and a lateral speaker thickness $T_s$. The sliding mount length $L_m$ and the lateral mount thickness $T_m$ can be less than the respective speaker length $L_s$ and the lateral speaker thickness $T_s$, thereby limiting the amount of the flexible band that is constrained by the slidable mounts and the size of the slidable mounts pressed by the flexible band against the user's head.

The present invention can also provide a method of wearing a wearable electronic display having an eyewear display. The eyewear display can be secured to a user's head with a flexible band attached to the eyewear display. At least one speaker can be slidably attached below the flexible band with a slidable mount. The slidable mount is capable of sliding forwardly and rearwardly on the flexible band for adjusting the at least one speaker to the user's ears.

In particular embodiments, two speakers can be slidably attached below the flexible band on opposite sides of the eyewear display with two respective slidable mounts which slide on the flexible band. Each slidable mount can have a sliding mount length $L_m$ and a lateral mount thickness $T_m$. Each speaker can have a speaker length $L_s$ and a lateral speaker thickness $T_s$. The sliding mount length $L_m$ and the lateral mount thickness $T_m$ can be less than the respective speaker length $L_s$ and the lateral speaker thickness $T_s$, thereby limiting the amount of the flexible band that is constrained by the slidable mount and size of the slidable mount pressed by the flexible band against the user's head. The speakers can be mounted to the slidable mounts with respective stems which are angled rearwardly. The speakers can be positioned on an upper side of a portion of the stems. The flexible band can be formed from a fabric strap. Each slidable mount can include a narrow flattened post having a slot through which the flexible band extends. A resilient forehead support can extend from the eyewear display rearwardly for providing support against the user's forehead. The forehead support can include a rubber member having elongate lateral slots for providing flexibility to the forehead support to adjust to different head sizes.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figure 1:
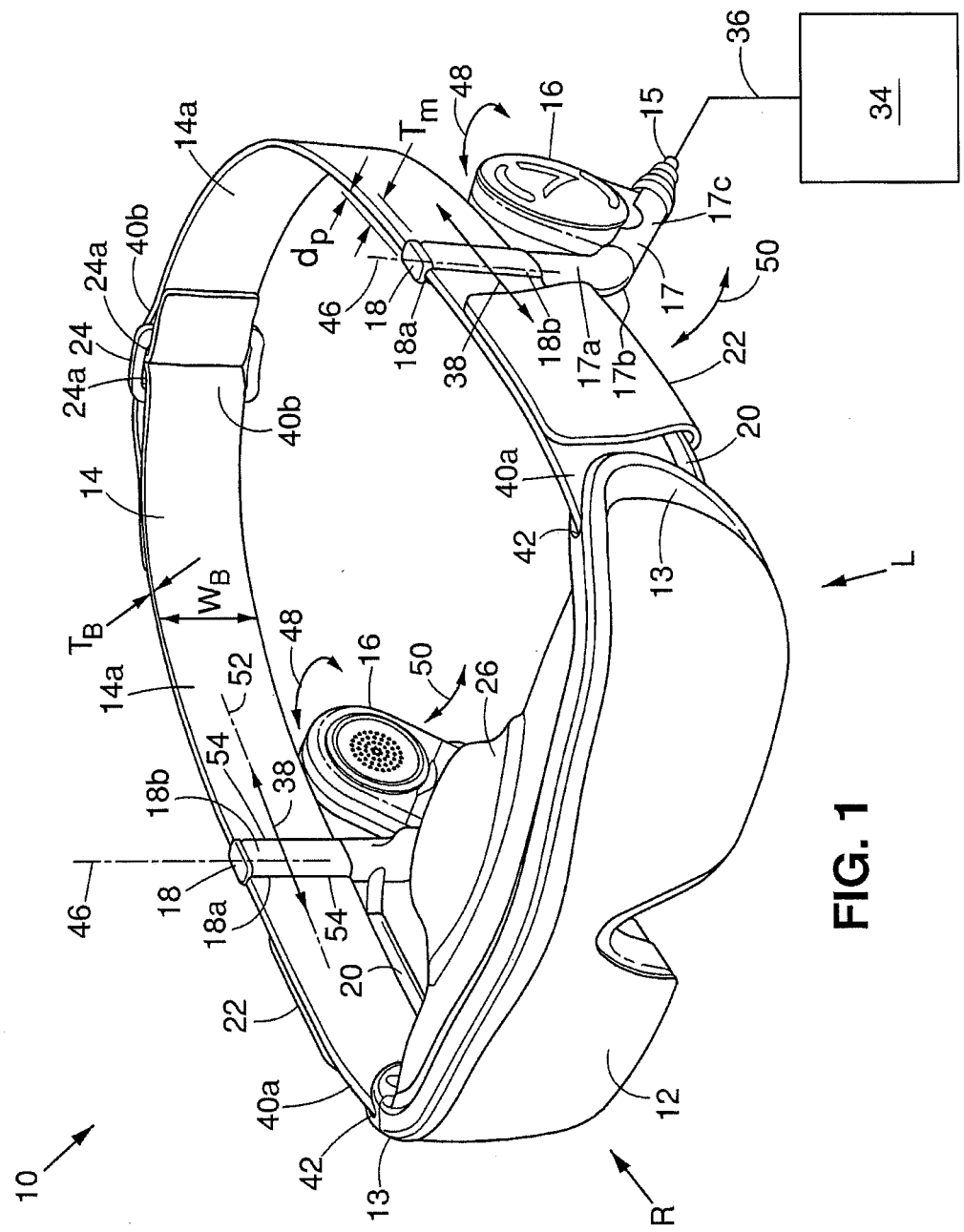
FIG. 1 is a perspective view of an embodiment of a wearable electronic display in the present invention.
Figure 2:
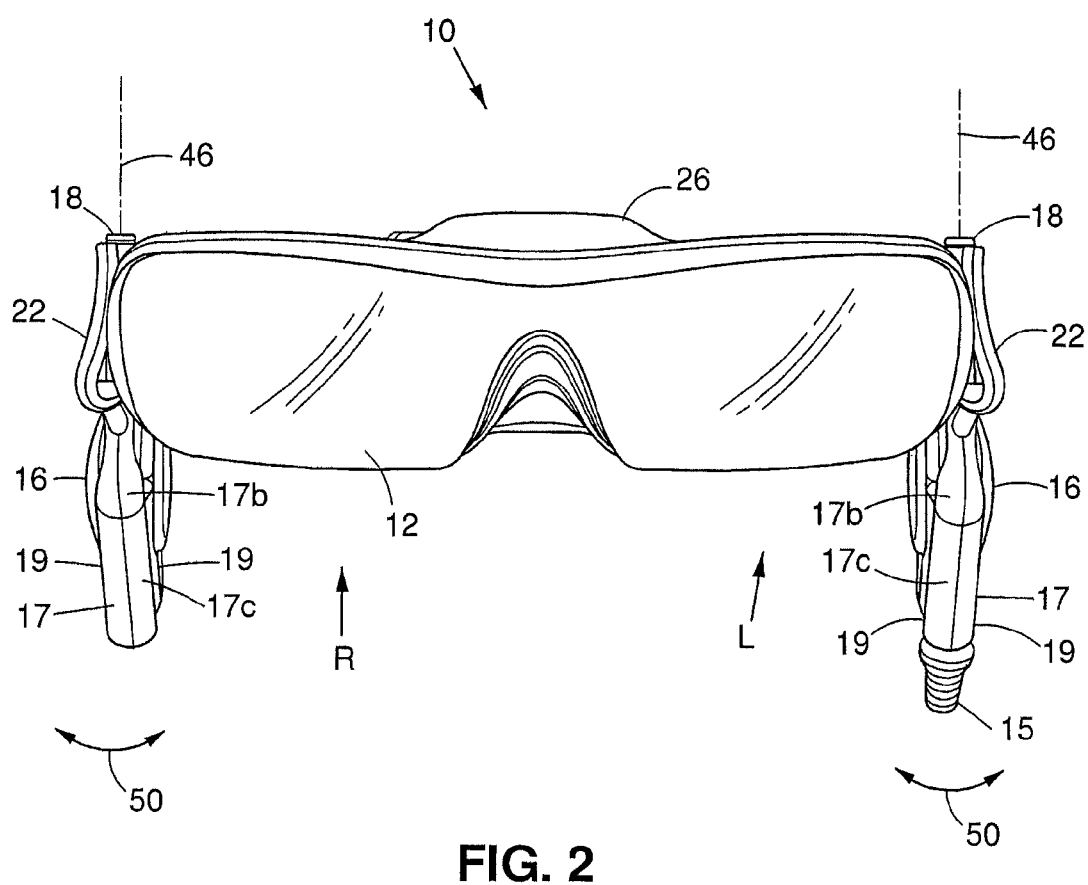
FIG. 2 is a front view of the wearable electronic display of FIG. 1.

Referring to FIGS. 1-8, in one embodiment, wearable electronic display, device or apparatus 10 can include an electronic eyewear display 12 which can be adjustably attached, secured or tightened to a user's head 56 (FIG. 8) with an adjustable, flexible securement band or strap 14 attached to the display 12. A forehead support pad or member 26 can extend rearwardly from the back or rear of the display 12 to allow the display 12 to be secured or rest against the user's forehead 60 with comfort. The display 12 can be an electronic binocular display device as known in the art, having image display panels for generating images as well as viewing optics 12a on the right side R and the left side L, for providing binocular viewing of the generated images. The images generated can include computer and video images. Two speakers 16 that provide the user with audio or sound, can be slidably mounted to the flexible band 14 on opposite sides R and L of the display 12, and can be adjusted forwardly and rearwardly in order to adjust to user's ears 58. The audio and images can be provided to the display apparatus 10 by a source or device 34, which can be through a cable or line 36 connected to and between the source 34 and the display apparatus 10. The cable 36 can be connected to one speaker 16 via a connector 15 (FIGS. 1 and 2). The source 34 can be any suitable source, including a computer, a video or disc player, cable link, an interactive telephone, etc. In some embodiments, the display apparatus 10 can include or be connected to an antenna for receiving wireless communications from source 34 or other suitable devices.

Figure 3:
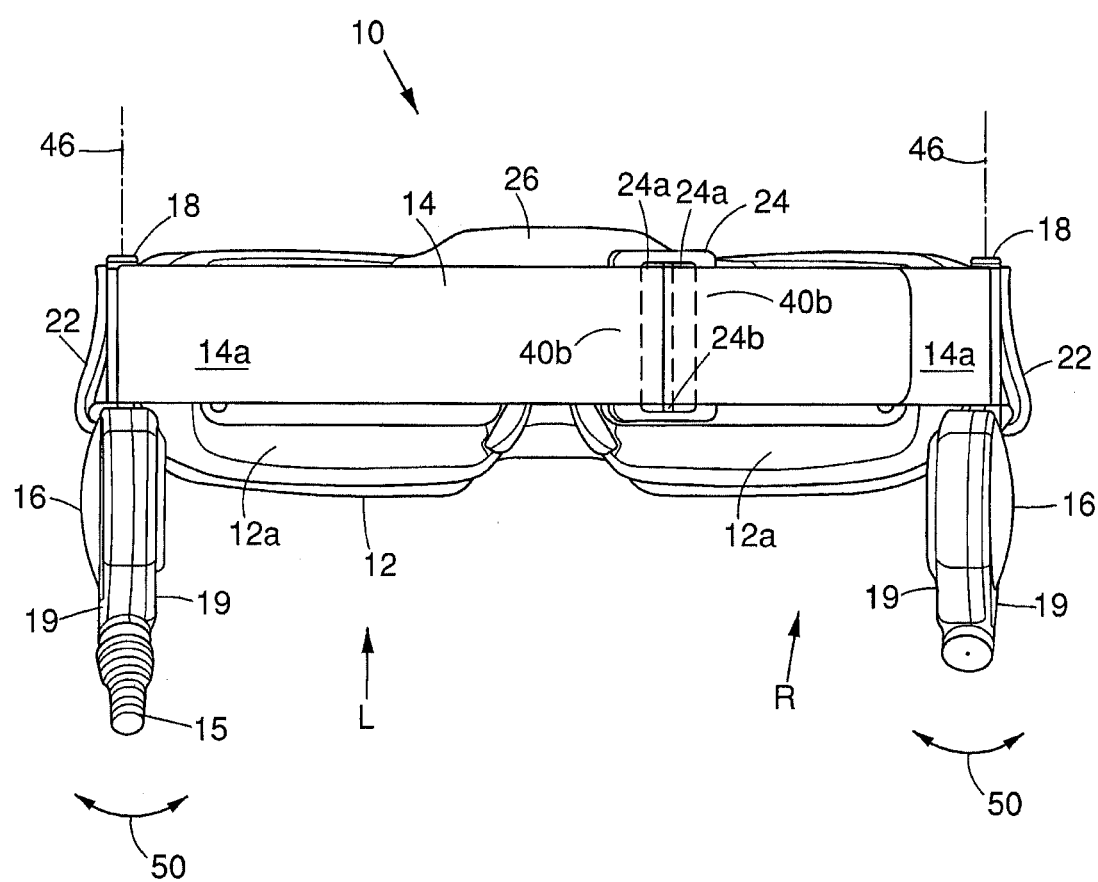
FIG. 3 is a rear view of the wearable electronic display of FIG. 1.
Figure 4:
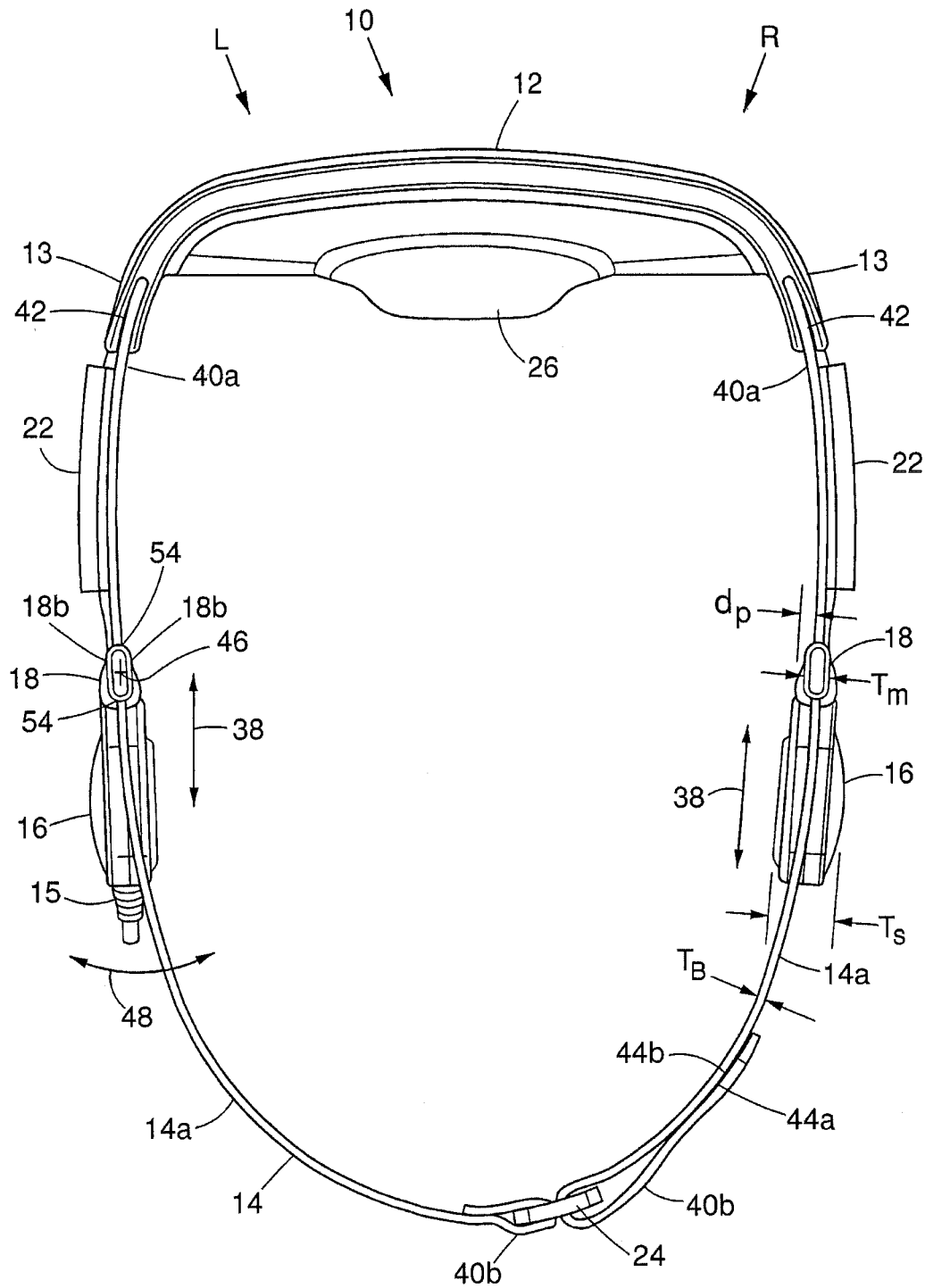
FIG. 4 is a top view of the wearable electronic display of FIG. 1.
Figure 5:
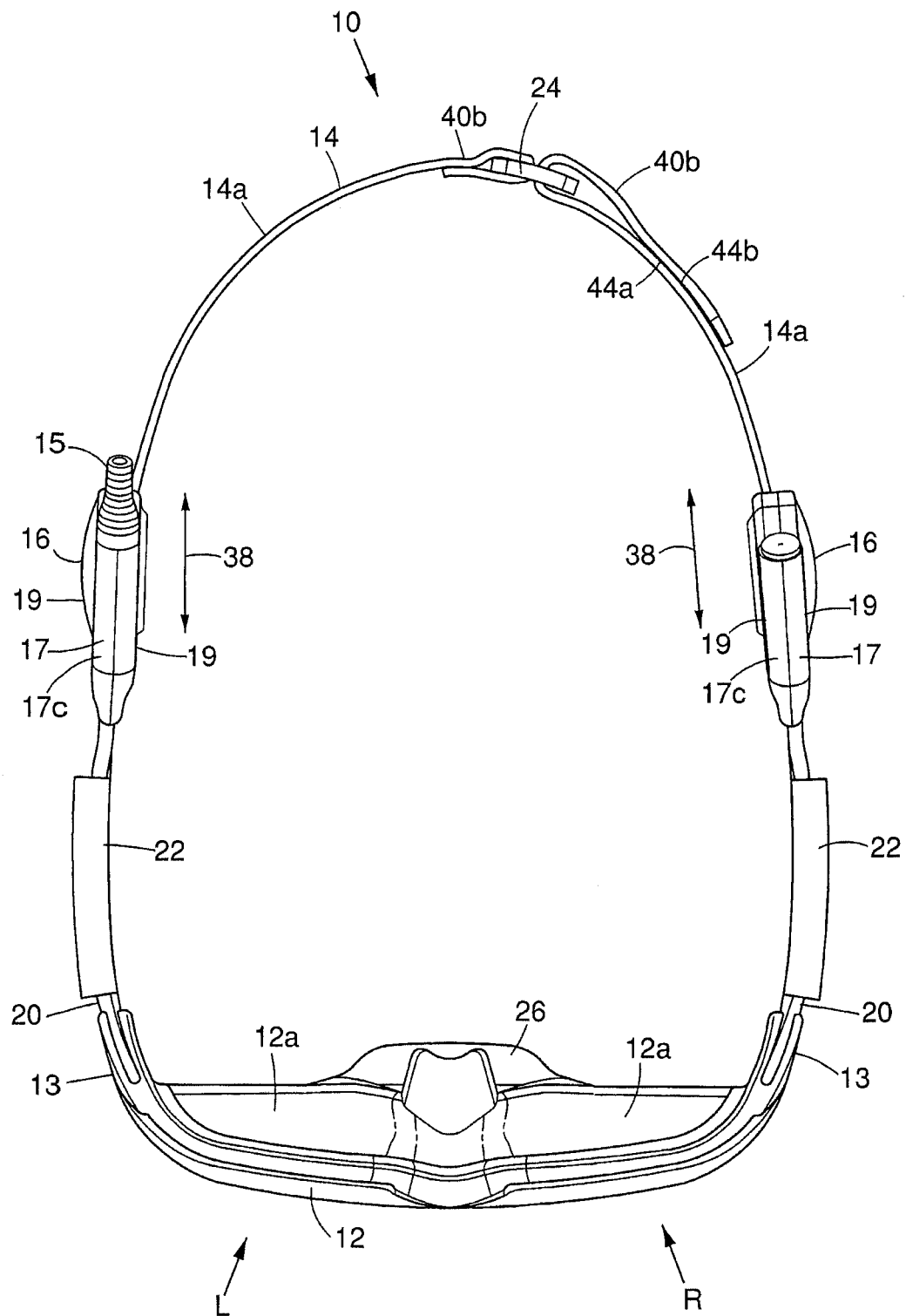
FIG. 5 is a bottom view of the wearable electronic display of FIG. 1.

Further details of display apparatus 10 now follow, with the components of display apparatus 10 being described as oriented in an upright viewing position. It is understood that different orientations of display apparatus 10 for viewing can be possible, such as when reclining or lying down. The flexible band 14 in one embodiment can be formed of a bendable or flexible woven fabric strap, which can be generally non-stretchable. The flexible band 14 can include right side R and left side L securement band or strap portions 14a. The front ends 40a of each band portion 14a can be secured, attached or connected to right side R and left side L ends 13 of display 12, such as to or within slots or openings 42 within the ends 13. The distal or rear ends 40b of the band portions 14a can be adjustably secured together with an adjustable band or strap adjuster, connector, fastener or buckle 24. The adjuster buckle 24 can have two adjacent slotted openings 24a separated by a bar 24b (FIG. 3). The adjuster buckle 24 can be secured or fixed to the distal end 40b of the one band portion 14a through one opening 24a, and the distal end 40b of the other band portion 14a can be adjustably passed through the other opening 24a of the adjuster buckle 24 and secured to itself with mating opposing hook and loop portions or surfaces 44a and 44b, located or positioned on that distal end 40b (FIGS. 4 and 5). This can provide a simple, compact and light weight manner of securing the display 12 to a user's head 56. In other embodiments, the adjuster buckle 24 can be replaced with other suitable adjustment and securement devices as known in the art. In some embodiments, the flexible band 14 can be a single strap or band that is adjusted. The flexible band 14 is often formed of a woven fabric strap, but in other embodiments, can be formed of other suitable materials such as flexible polymeric material, rubber, plastic, leather, hook and loop fastener, etc. The flexible band 14 can in some embodiments, can be resilient or stretchable if desired.

Each speaker 16 can be slidably mounted to and below a band portion 14a of the flexible band 14 on the right side R and the left side L by a slidable fixture, portion, member or mount 18. Each slidable mount 18 can have an elongate flattened post shape with generally flattened surfaces 18b opposite to each other and on opposite sides of a vertical, upright or longitudinal elongate slot 18a extending through the slidable mount 18. The slot 18a can extend through the slidable mount 18 transverse or orthogonal relative to the longitudinal axis 46 of the slidable mount 18 and form a sliding joint that moves or slides in the direction of the longitudinal length of the band portion 14a. Axis 46 is typically generally oriented vertical or upright when display apparatus 10 is worn by a user in an upright position. Each band portion 14a of the flexible band 14 passes or extends through the slot 18a of a slidable mount 18. The slots 18a and the band portions 14a of flexible band 14 are sized such that width $W_B$ and/or thickness $T_B$ of the flexible band 14 can have a frictional sliding fit with the slots 18a. For example, the slots 18a can have a width that is near or about the thickness $T_B$, and a height that is near or about the width $W_B$. This can allow the position of the speakers 16 to be moveably or slidably adjusted forwardly and rearwardly on the flexible band 14 along its longitudinal length relative to display 12 in the direction of arrows 38, while providing sufficient friction to maintain the sliding mounts 18 and speakers 16 in the desired position once adjusted.

Figure 6:
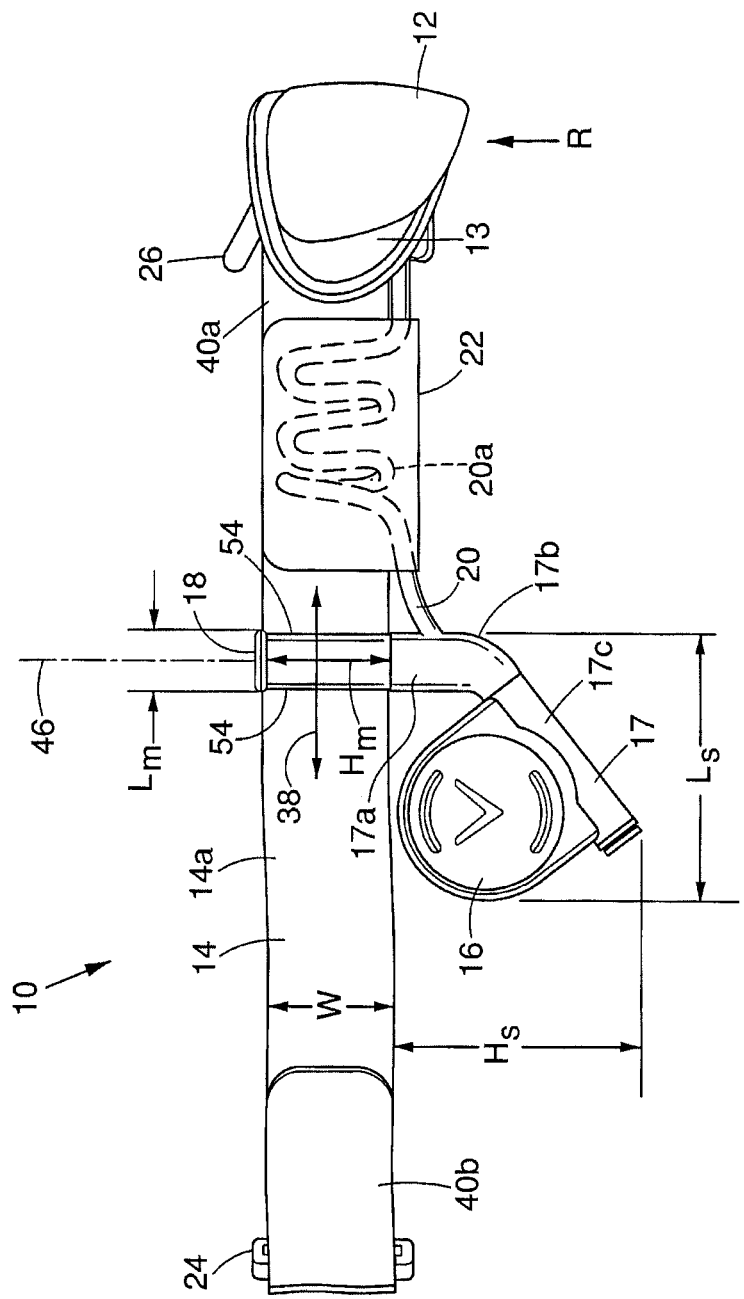
FIG. 6 is a right side view of the wearable electronic display of FIG. 1.
Figure 7:
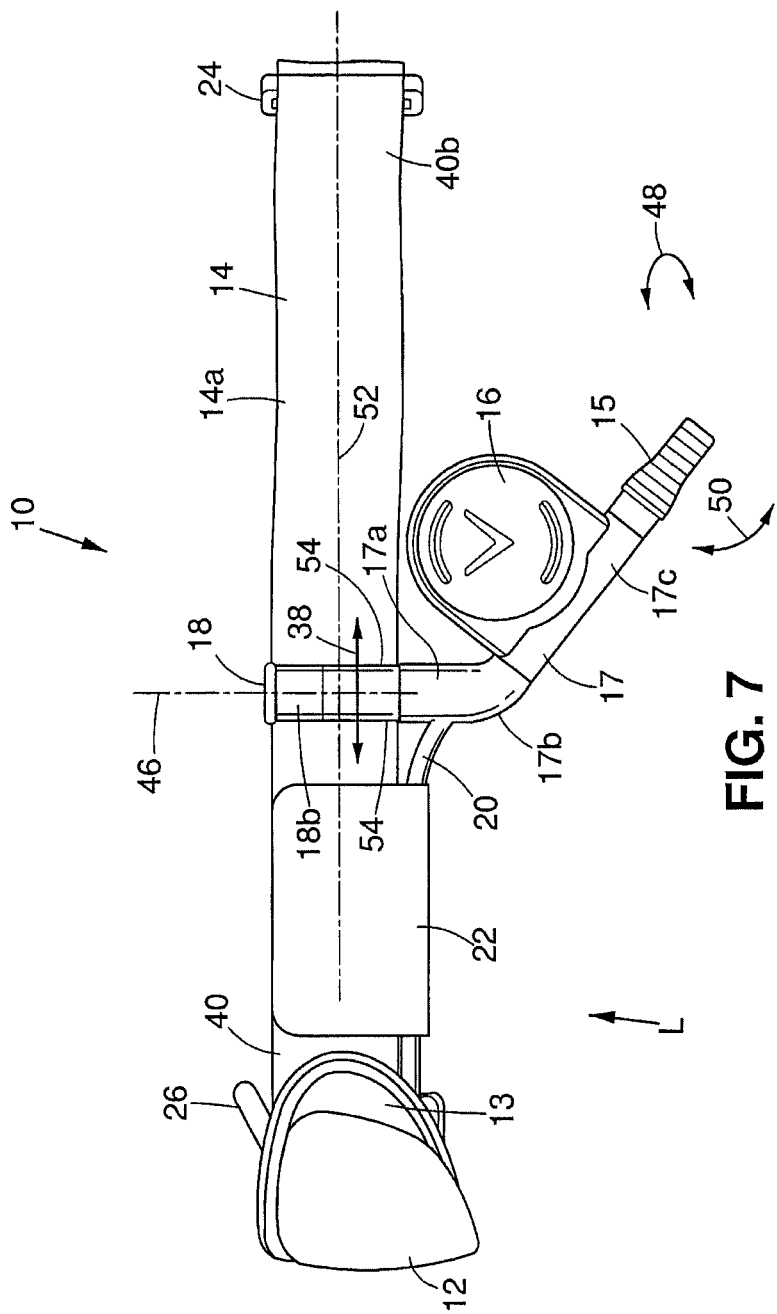
FIG. 7 is a left side view of the wearable electronic display of FIG. 1.
Figure 8:
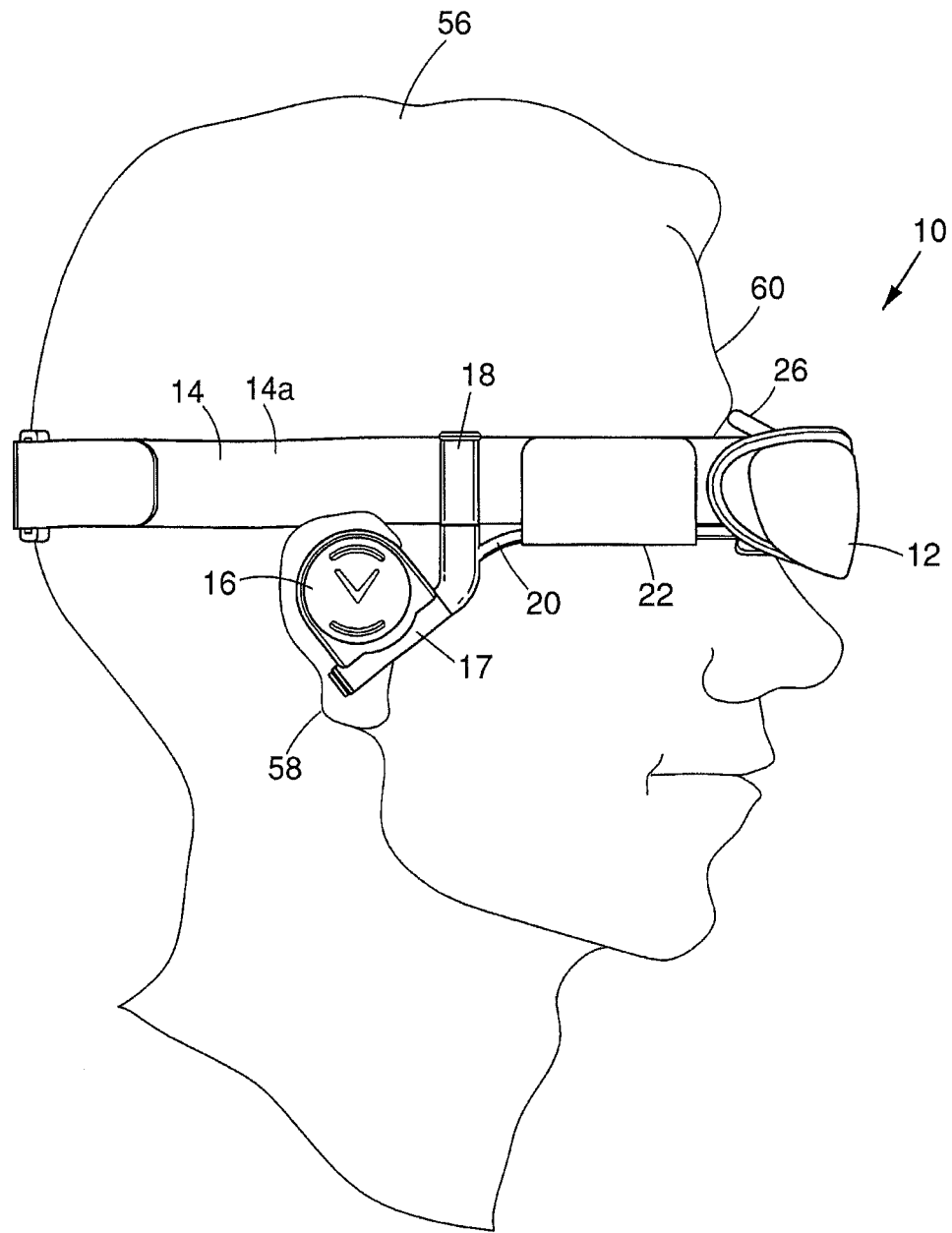
FIG. 8 is a side view of the wearable electronic display of FIG. 1 worn on the head of a user.

Each speaker 16 can also extend below a slidable mount 18 and a band portion 14a of flexible band 14 on a stem 17 that extends downwardly from the slidable mount 18. Each stem 17 can have a straight portion 17a extending generally inline from the longitudinal bottom end of a slidable mount 18 along axis 46, which is vertically downward when the slidable mount 18 is in an upright position. The stem 17 can have an angled straight portion 17c extending downwardly rearwardly at an angle relative to straight portion 17a (FIGS. 1, 6 and 7). Portions 17a and 17c can be connected together by a curve or angle 17b. In one embodiment, the portion 17a can be angled at about 55° relative to portion 17a, but the angle can be greater or less in other embodiments. Each speaker 16 can extend vertically upwardly from the upward facing side of the angled portion 17c of stem 17 towards the flexible band 14. This can position each speaker 16 just below or adjacent to the flexible band 14 on the right hand side R and the left hand side L for positioning over or adjacent to the user's ears 58. In addition, the angled configuration of each stem 17 can position each slidable mount 18 forwardly or in front of the ears 58 and speakers 16, and therefore forwardly closer to the display 12 than if the speakers 16 were merely extended straight down from the slidable mounts 18. This can be beneficial in view that each speaker 16 is electrically connected to the display 12 with an electrical wire 20. The electrical wire 20 can be connected to the portion 17a of each stem 17 and to each end 13 of the display 12 on the right side R and the left side L. Therefore, positioning each stem 17 forwardly closer to the display 12 can minimize the length of the portion of the wire 20 extending between the ends 13 of the display 12 and each stem 17.

The angled stems 17 can orient or position each speaker 16 below a band portion 14a of flexible band 14 rearwardly laterally offset from the longitudinal axis 46 of each slidable mount 18, which can allow each speaker 16 to swing, move or pivot about axis 46 of each slidable mount 18 inwardly and outwardly in the direction of the arrows 48. Furthermore, extending each speaker 16 below a band portion 14a of the flexible band 14 allows the speaker 16 to swing, move or pivot about the longitudinal central axis 52 of the longitudinal length of the flexible band 14, inwardly and outwardly in the direction of arrows 50. Such two axis movement or pivoting can allow the speakers 16 to move outwardly relative to flexible band 14 and from each other when the display apparatus 10 is worn by a user to adjust to the particular user's ears 58. For example, it is apparent that when the display apparatus 10 is secured to the user's head 56, the flexible band 14 is typically secured against the head 56. Since a person's ears 58 protrude outwardly from the head 56, allowing the speakers 16 to move or pivot in the direction of the arrows 48 and 50 can allow the speakers 16 to move outwardly relative to the flexible band 14 and the user's head 56 to adjust to the protruded position of the ears 58.

Such movement or pivoting of the speakers 16 can be permitted or allowed by flexibility of the flexible band 14. For example, for a flexible band 14 formed of a woven fabric strap extending through the slot 18a of a narrow post shaped slidable mount 18, the flexible band 14 can have sufficient flexibility to allow the post shaped slidable mount 18 to twist or torque about axis 46 while on the flexible band 14, by folding, bending or deforming the flexible band 14 along longitudinal contact lines 54 between the slidable mount 18 and the flexible band 14, thereby allowing movement in the direction of arrows 48 (FIG. 4). The narrow post shape of the slidable mount 18 along the axis 46 forms a short sliding mount length $L_m$ which allows the speaker 16 to twist more easily on lines 54 than a wider slidable mount. The sliding length $L_m$ of the slidable mount 18 relative to the longitudinal length or height $H_m$ along longitudinal axis 46 can have a ratio $L_m/H_m$ of about 1:2. The flexible band 14 can also allow the slidable mount 18 to twist about the longitudinal central axis 52 of flexible band 14 by bending or deforming the band portion 14a of the flexible band 14 in a longitudinal twisting or torsion motion, thereby allowing movement in the direction of arrows 50 (FIGS. 1 and 7). When the flexible band 14 is secured to the user's head 56, the band portions 14a and band 14 are secured in tension. Consequently, the folding, bending, deforming, twisting or torsion of the flexible band 14 is restricted by the tension in the flexible band 14, resulting in resilient movement of the speakers 16 in the direction of the arrows 48 and 50. This can allow the speakers 16 to be resiliently adjusted or pressed against the user's ears 58 in a simple light weight manner. The two axis twisting can allow the speakers 16 to move a greater amount than if only having one axis of twisting.

Each slidable mount 18, speaker 16 and stem 17 can be a relatively flat assembly formed of more than one piece or housing portion 19. The housing portions 19 can be plastic and two housing portions 19, which can be in two halves, can be assembled together. In some embodiments, when the housing portions 19 are assembled, the slidable mount 18, speaker 16 and stem 17, can have the appearance or quality of being generally integral with each other. The slidable mount 18, speaker 16 and stem 17 can be generally centered along a plane extending rearwardly through axis 46 of slidable mount 18, as seen in FIGS. 1 and 4. The speaker 16 can include the part of the outer housing portions 19 extending upwardly from the stem portion 17c, and can enclose, contain or house a speaker element or member.

When using a flexible material for the flexible band 14, such as a woven fabric strap, the flexible band 14 still should have enough vertical rigidity to support the speakers 16. In one embodiment, this can be provided by forming the flexible band 14 with a width $W_B$ that is about 12 times greater than the thickness $T_B$ which can provide a $W_B/T_B$ ratio of about 12:1. In other embodiments, the $W_B/T_B$ ratio can be greater or less, but is usually at least 8:1. A thin thickness $T_B$ can provide the lateral flexibility needed for flexible band 14 to conform to the user's head 56 with comfort, as well as to allow adjustment, and the large width $W_B$ can provide the flexible band 14 with a large area moment of inertia $I_B$ in the vertical upright direction $$I_B = \frac{T_B W_B^3}{12}$$

to provide the flexible band 14 with sufficient vertical rigidity when secured on a user's head 56 in tension to support the speakers 16. In some embodiments, the flexible band 14 can often have a thickness $T_B$ around 1/16 to 1/8 inches, but can vary depending upon the material used.

Referring to FIGS. 1 and 4-8, the narrow post design of each slidable mount 18 can also contribute to the comfort of the user. As can be seen, each speaker 16 can have a lateral width or thickness $T_s$, a length $L_s$ and a height $H_s$, extending below the flexible band 14. It is apparent that if the whole length $L_s$ of the speaker 16 were slidably mounted to the flexible band 14, and the flexible band 14 pressed the whole length $L_s$ of the speaker against the user's head 56 above the ears 58, it could be uncomfortable to the user. Instead, in embodiments of the present invention, by mounting the speakers 16 to the slidable mounts 18 below the flexible band 14, only the narrow minimally sized sliding mount length $L_m$ and height $H_m$ of the slidable mounts 18 are pressed by the flexible band 14 against the head 56 above the ears 58. In addition, each slidable mount 18 has a narrow lateral mount thickness $T_m$ between the flattened surfaces 18b, and the inside surface 18b protrudes inwardly from flexible band 14 only a slight or minimal protrusion distance $d_p$. This small sized protrusion distance $d_p$ and the flattened surface 18b can contact the user's head 56 above the ears 58 with relative comfort. The size of the sliding mount length $L_m$ and lateral mount thickness $T_m$ of the slidable mount 18 are much less than the corresponding or respective speaker length $L_s$ and lateral speaker thickness $T_s$ of a speaker 16, so that the slidable mount 18 can provide more comfort than if the whole speaker length $L_s$ of speaker 16 was mounted along flexible band 14. Also, very little of the flexible band 14 is constrained by the slidable mounts 18, so that the majority of the flexible band 14 can contact the user's head 56, contributing to comfort. The sliding mount length $L_m$ of the slidable mounts 18 can in some cases, only take up or extend only about 6% of the length of the band portions 14a of the flexible band 14 on each side R and L.

Referring to FIG. 6, the wires 20 can extend from the display 12 to the speakers 16, under or adjacent to flexible band 14, and can be maintained in or covered by a slide cover 22 on each side R and L. The wires 20 can be bent within the side covers 22, as shown, and/or the display 12, to provide or allow expansion and contraction in length when the speakers 16 slide forwardly and rearwardly. For example, the wires 20 can be bent back and forth in an alternating or zig zag pattern or fashion. The display 12 can have a removable cover which can be held in place with hook and loop fasteners or a snap fit, for easy opening and closing. The side covers 22 can also have similar securement features.

Figure 9:
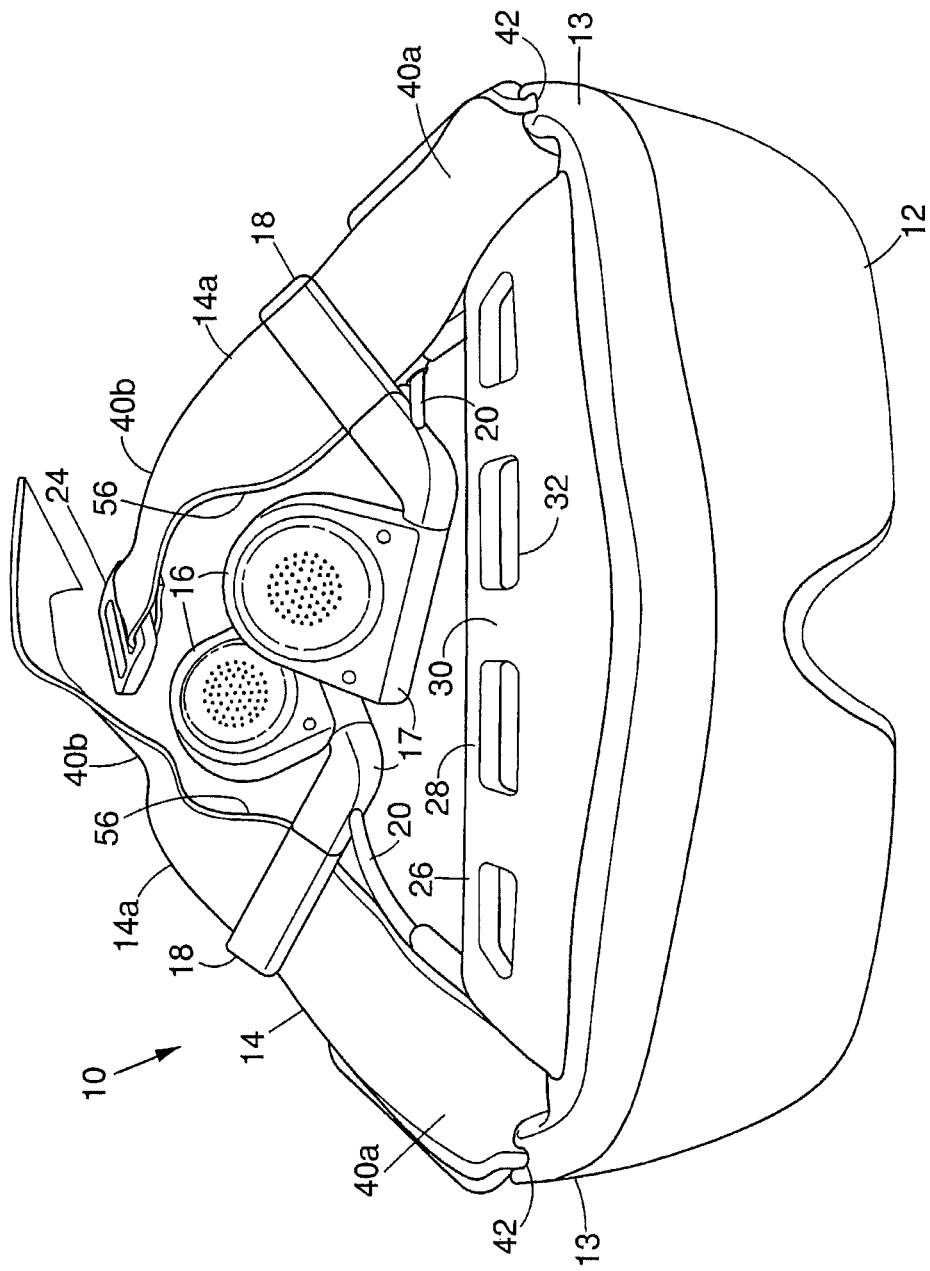
FIG. 9 is a perspective view of another embodiment of a wearable electronic display.

Referring to FIG. 9, in another embodiment, the forehead support 26 can extend rearwardly from the rear upper side of the display 12. The forehead support 26 can be formed of resilient rubber or foam to provide comfortable support against a user's forehead 60 and to allow the display apparatus 10 to fit various head sizes or shapes. The forehead support 26 can be formed from a planar sheet and have a series of lateral holes, openings or slots 32 along the rear edge to form thin resilient bar members or regions 28 at the rear, separated by solid regions 30. This can provide resilient bending or flexibility on the rear edge against the user's forehead 60, to adjust to the size and shape of different user's heads. In one embodiment, the forehead support 26 can have four lateral slots 32 positioned in series to form four resilient thin bar regions 28 along the rear edge, which are spaced apart from each other in series. The thin bar regions 28 can bend or deflect forwardly or inwardly to allow the forehead support 26 to conform to a particular user's head. The solid regions 30 can provide some stiffness, and can also bend or deform a certain amount since they are separated from each other by slots 32. The lengths of the thin bar regions 28 can be oriented along the rear edge of forehead support 26 generally transverse or orthogonal to the orientation of the two band portions 14a when display apparatus 10 is worn by a user. In other embodiments, the number of slots 32 and bars 28 can be greater or less. The distal ends 40b of the band portions 14a can have narrowed widths which narrow down from the width $W_B$ at a location beyond the region where the slidable mounts 18 are mounted to the band portions 14a. Curved or angled narrowing portions 56 can provide transition in the region where the width $W_B$ of the band portions 14a narrow down to the desired width at the distal ends 40b.

While this invention has been particularly shown and described with references to example embodiments thereof, it will be understood by those skilled in the art that various changes in form and details may be made therein without departing from the scope of the invention encompassed by the appended claims.

Although the display apparatus 10 has been shown in the drawings to have a binocular display 12 and two speakers 16, it is understood that in some embodiments, display apparatus 10 can have a monocular display and/or only one speaker 16.

What is claimed is:

1. A wearable electronic display comprising;
an eyewear display;
a flexible band attached to the eyewear display for securing the eyewear display to a user's head; and
at least one speaker slidably attached below the flexible band by a slidable mount, the slidable mount capable of sliding forwardly and rearwardly on the flexible band for slidably adjusting the at least one speaker to the user's ears, the slidable mount being stiff and extending along a longitudinal axis, a slot extending along a height of the slidable mount and through the slidable mount transverse to the longitudinal axis of the slidable mount, the flexible band extending through the slot and the slidable mount having a sliding mount length relative to the flexible band, a member extending downwardly from the slidable mount to which the at least one speaker is mounted in a position below the flexible band and laterally offset from the longitudinal axis of the slidable mount, the sliding mount length being substantially shorter than the height for allowing the slidable mount to twist about the longitudinal axis of the slidable mount and along contact lines with the flexible band to provide flexible outward adjustment of the at least one speaker against at least one ear of the user.

2. The wearable electronic display of claim 1 in which two speakers are slidably attached below the flexible band on opposite sides of the eyewear display by two respective slidable mounts which slide on the flexible band.

3. The wearable electronic display of claim 2 in which each slidable mount has the sliding mount being length $L_m$ and a lateral mount thickness $T_m$, and each speaker has a speaker length $L_s$ and a lateral speaker thickness $T_s$, the sliding mount length $L_m$ and the lateral mount thickness $T_m$, being less than the respective speaker length $L_s$ and the lateral speaker thickness $T_s$, thereby limiting the amount of the flexible band that is constrained by the slidable mount and size of the slidable mount pressed by the flexible band against the user's head.

4. The wearable electronic display of claim 2 in which the speakers are mounted to the slidable mounts by respective stems which are angled rearwardly.

5. The wearable electronic display of claim 4 in which the speakers are positioned on an upper side of a portion of the stems.

6. The wearable electronic display of claim 1 in which the flexible band comprises a fabric strap.

7. The wearable electronic display of claim 6 in which the slidable mount comprises a narrow flattened post having the slot through which the flexible band extends.

8. The wearable electronic display of claim 1 further comprising a resilient forehead support extending from the eyewear display rearwardly for providing support against the user's forehead.

9. The wearable electronic display of claim 8 in which the forehead support comprises a rubber member having elongate lateral slots for providing flexibility to the forehead support to adjust to different head sizes.

10. A wearable electronic display comprising:
an eyewear display;
a flexible band attached to the eyewear display for securing the eyewear display to a user's head; and
two speakers slidably attached below the flexible band on opposite sides of the eyewear display by two respective slidable mounts, the slidable mounts capable of sliding forwardly and rearwardly on the flexible band for slidably adjusting the speakers to the user's ears, each slidable mount comprising a stiff narrow flattened post extending along a longitudinal axis, and having a slot extending along a height of the slidable mount and through the slidable mount transverse to the longitudinal axis of the slidable mount, the flexible band extending through the slot and the slidable mount having a sliding mount length relative to the flexible band, a member extending downwardly from the slidable mount to which a respective speaker is mounted in a position below the flexible band and laterally offset from the longitudinal axis of the slidable mount, the sliding mount length being substantially shorter than the height for allowing the slidable mount to twist about the longitudinal axis of the slidable mount and along contact lines with the flexible band to provide flexible outward adjustment of the respective speaker against a respective ear of the user, each slidable mount also having the sliding mount length being $L_m$ and a lateral mount thickness $T_m$, and each speaker having a speaker length $L_s$ and a lateral speaker thickness $T_s$, the sliding mount length and the lateral mount thickness $T_m$, being less than the respective speaker length $L_s$ and the lateral speaker thickness $T_s$, thereby limiting the amount of the flexible band that is constrained by the slidable mounts and the size of the slidable mounts pressed by the flexible band against the user's head.

11. A method of wearing a wearable electronic display having an eyewear display comprising;
securing the eyewear display to a user's head with a flexible band attached to the eyewear display; and
slidably attaching at least one speaker below the flexible band with a slidable mount, the slidable mount capable of sliding forwardly and rearwardly on the flexible band for slidably adjusting the at least one speaker to the user's ears, the slidable mount being stiff and extending along a longitudinal axis, a slot extending along a height of the slidable mount and through the slidable mount transverse to the longitudinal axis of the slidable mount, the flexible band extending through the slot and the slidable mount having a sliding mount length relative to the flexible band, a member extending downwardly from the slidable mount to which the at least one speaker is mounted in a position below the flexible band and laterally offset from the longitudinal axis of the slidable mount, the sliding mount length being substantially shorter than the height for allowing the slidable mount to twist about the longitudinal axis of the slidable mount and along contact lines with the flexible band to provide flexible adjustment of the at least one speaker against at least one ear of the user.

12. The method of claim 11 further comprising slidably attaching two speakers below the flexible band on opposite sides of the eyewear display with two respective slidable mounts which slide on the flexible band.

13. The method of claim 12 further comprising providing each slidable mount with the sliding mount length being $L_m$ and a lateral mount thickness $T_m$, and each speaker with a speaker length $L_s$ and a lateral speaker thickness $T_s$, the sliding mount length $L_m$ and the lateral mount thickness $T_m$, being less than the respective speaker length $L_s$ and the lateral speaker thickness $T_s$, thereby limiting the amount of the flexible band that is constrained by the slidable mount and size of the slidable mount pressed by the flexible band against the user's head.

14. The method of claim 12 further comprising mounting the speakers to the slidable mounts with respective stems which are angled rearwardly.

15. The method of claim 14 further comprising positioning the speakers on an upper side of a portion of the stems.

16. The method of claim 11 further comprising forming the flexible band from a fabric strap.

17. The method of claim 16 further comprising forming the slidable mount as a narrow flattened post having the slot through which the flexible band extends.

18. The method of claim 11 further comprising extending a resilient forehead support from the eyewear display rearwardly for providing support against the user's forehead.

19. The method of claim 18 further comprising forming the forehead support as a rubber member having elongate lateral slots for providing flexibility to the forehead support to adjust to different head sizes.

* * * * *

UNITED STATES PATENT AND TRADEMARK OFFICE
CERTIFICATE OF CORRECTION

PATENT NO. : 8,545,013 B2  
APPLICATION NO. : 13/093378  
DATED : October 1, 2013  
INVENTOR(S) : Hoosung Hwang and Jhang Woo Lee Page 1 of 1

It is certified that error appears in the above-identified patent and that said Letters Patent is hereby corrected as shown below:

In the Claims  
Column 8, Claim 10, Line 50, after the word "length", please insert -- $L_m$ --

Signed and Sealed this  
Seventeenth Day of December, 2013

Margaret A. Focarino  
*Commissioner for Patents of the United States Patent and Trademark Office*